United States Patent
Cheng et al.

(10) Patent No.: US 12,222,536 B1
(45) Date of Patent: Feb. 11, 2025

(54) TOUCHPAD STRUCTURE

(71) Applicants: LITE-ON Technology (Chang Zhou) Co., LTD., Jiangsu Province (CN); LITE-ON Technology Corporation, Taipei (TW)

(72) Inventors: Ching-Lung Cheng, Taipei (TW); Yuan Du, Jiangsu Province (CN); Jen-Chieh Huang, Taipei (TW)

( * ) Notice: Subject to any disclaimer, the term of this patent is extended or adjusted under 35 U.S.C. 154(b) by 0 days.

(21) Appl. No.: 18/646,761

(22) Filed: Apr. 26, 2024

(30) Foreign Application Priority Data

Mar. 20, 2024 (CN) .......................... 202410324887.3

(51) Int. Cl.
*F21V 8/00* (2006.01)
(52) U.S. Cl.
CPC ......... *G02B 6/0055* (2013.01); *G02B 6/0068* (2013.01)
(58) Field of Classification Search
CPC .... G02B 6/0055; G02B 6/0068; G02B 6/005; G02B 6/0033; G02B 6/0066; G02F 1/1336; G02F 1/133602; G02F 1/133603; G02F 1/133615
See application file for complete search history.

(56) References Cited

U.S. PATENT DOCUMENTS

| | | | | |
|---|---|---|---|---|
| 9,726,366 B2 * | 8/2017 | Nakazawa | ........... | G06F 3/03547 |
| 10,990,227 B2 * | 4/2021 | Lin | ........ | G02B 6/0073 |
| 11,009,974 B2 * | 5/2021 | Pai | ........ | G06F 3/03547 |
| 11,474,632 B1 * | 10/2022 | Ho | ........ | G06F 3/0412 |
| 11,625,132 B2 * | 4/2023 | Dong | ................ | G06F 3/04164 |
| | | | | 345/174 |
| 2008/0185193 A1 * | 8/2008 | Lin | ........ | G06F 3/0446 |
| | | | | 178/18.06 |

* cited by examiner

*Primary Examiner* — Bao Q Truong (57) ABSTRACT

The present disclosure is related to a touchpad structure, which includes a cover plate, a backlight unit, a touch circuit layer, a first optical modulation layer, and a second optical modulation layer. The first optical modulation layer is disposed between the cover plate and the backlight unit, and having a first reflectivity. The second optical modulation layer is disposed between the first optical modulation layer and the touch circuit layer. The second optical modulation layer has a second reflectivity and a first penetration rate, wherein the second reflectivity is the same as the first reflectivity, or the first reflectivity is the same as the first penetration rate. The touchpad structure can present a uniform color spectrum via the second optical modulation layer and the first optical modulation layer.

13 Claims, 8 Drawing Sheets

TOUCHPAD STRUCTURE

CROSS-REFERENCE TO RELATED APPLICATIONS

This application claims the priority benefit of Chinese Patent Application Serial Number 2024103248873, filed on Mar. 20, 2024, the full disclosure of which is incorporated herein by reference.

TECHNICAL FIELD

The present disclosure relates to an electronic device, more particularly, it relates to a touchpad structure.

DESCRIPTION OF RELATED ART

The touchpad is one of the inputting devices, and has been widely used in the notebook computers. At the same time, in order to meet the needs of the consumers, the luminous touchpads have also been produced accordingly.

Generally, the touchpad can define a touch area and a non-touch area, to ensure that the light emitted by the light source of the touchpad only passes through the touch area of the touchpad, the touch area and the non-touch area of the touchpad have different structures, the different structures result in different reflectance between the touch area and the non-touch area when the touch area does not emit light, leading to color deviation and causing a poor visual experience for the users.

Therefore, how to provide it is desirous to overcome the above-mentioned problem.

SUMMARY OF THE INVENTION

The object of the present disclosure is to provide a touchpad structure to overcome the color deviation in touchpads.

To achieve the abovementioned object, the embodiment of the present disclosure provides a touchpad structure, including a cover plate, a backlight unit, a touch circuit layer, a first optical modulation layer, and a second optical modulation layer. The first optical modulation layer is disposed between the cover plate and the backlight unit, and having a first reflectivity. The second optical modulation layer is disposed between the first optical modulation layer and the touch circuit layer, and one side of the second optical modulation layer facing the touch circuit layer has a light shielding material, and defines a light penetration area. The second optical modulation layer has a second reflectivity and a first penetration rate, wherein the second reflectivity is the same as the first reflectivity or the first reflectivity is the same as the first penetration rate.

With the abovementioned content, the touchpad structure of the embodiment of the present disclosure achieves the purpose of improving the user's visual experience, by setting the second optical modulation layer between the light shielding material and the first optical modulation layer, to ensure that the second optical modulation layer and the first optical modulation layer have the same reflectivity or penetration rate, allowing the touch area and non-touch area of the touchpad structure to have the same refractive index via the second optical modulation layer and the first optical modulation layer, so that the touch area and non-touch area of the touchpad structure present the same color when not emitting light.

It should be understood, however, that this summary may not contain all aspects and embodiments of the present disclosure, that this summary is not meant to be limiting or restrictive in any manner, and that the invention as disclosed herein will be understood by one of ordinary skill in the art to encompass obvious improvements and modifications thereto.

BRIEF DESCRIPTION OF DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DESCRIPTION

The present disclosure will now be described more fully hereinafter with reference to the accompanying drawings, in which exemplary embodiments of the invention are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the invention. This description is made for the purpose of illustration of the general principles of the invention and should not be taken in a limiting sense. The scope of the invention is best determined by reference to the appended claims.

Moreover, the terms "include", "contain", and any variation thereof are intended to cover a non-exclusive inclusion. Therefore, a process, method, object, or device that comprises a series of elements not only include these elements, but also comprises other elements not specified expressly, or may include inherent elements of the process, method, object, or device. If no more limitations are made, an element limited by "include a/an . . . " does not exclude other same elements existing in the process, the method, the article, or the device which comprises the element.

In the following embodiment, the same reference numerals are used to refer to the same or similar elements throughout the invention.

Figure 1:
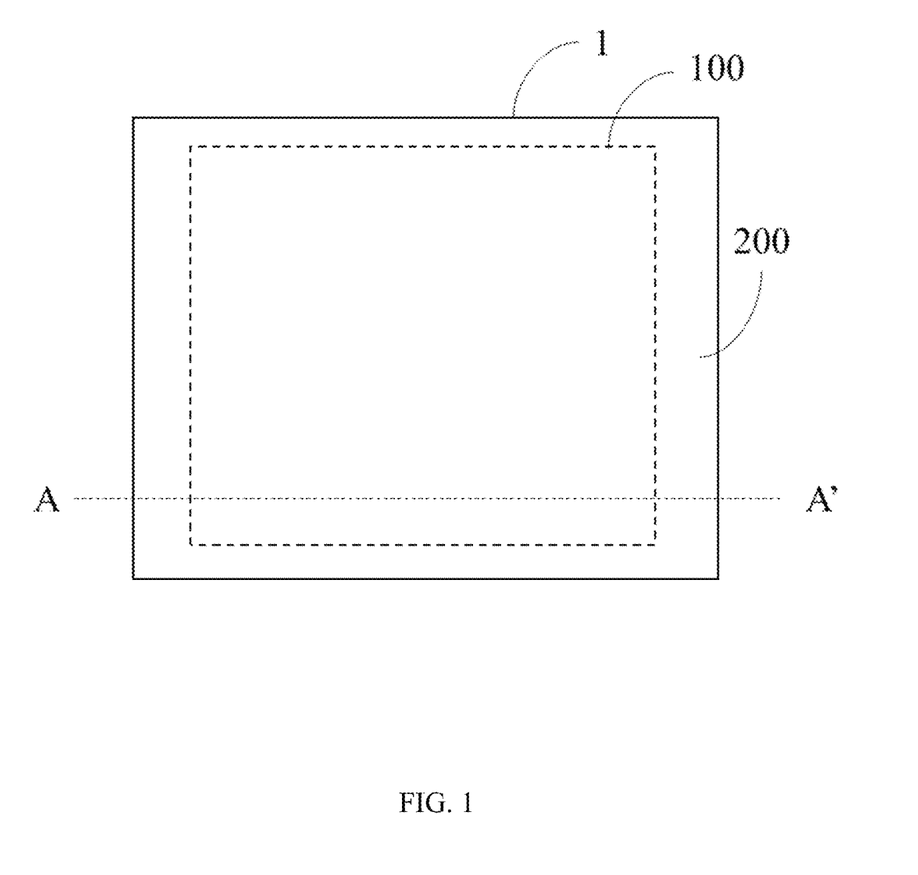
FIG. 1 illustrates a schematic drawing of the touchpad of the embodiment in the present disclosure.

Please refer to FIG. 1, wherein FIG. 1 illustrates a schematic drawing of the touchpad of the embodiment in the present disclosure. In the embodiment of FIG. 1, the touchpad 1 comprises a touch area 100 and a non-touch area 200, and the non-touch area 200 surrounds the touch area 100. The touch area 100 is used for detecting the touch signals input by the users.

Figure 2:
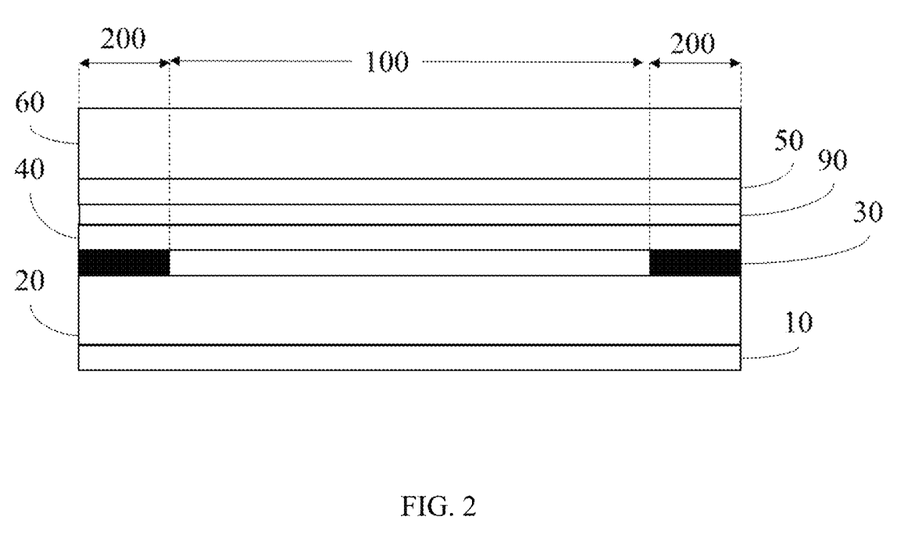
FIG. 2 illustrates a schematic drawing of the A-A' cross-section of the touchpad 1 of FIG. 1 of the embodiment.

Please refer to FIG. 2, wherein FIG. 2 illustrates a schematic drawing of the A-A' cross-section of the touchpad 1 of FIG. 1 of the embodiment. In the embodiment of FIG. 2, the touchpad 1 sequentially includes a touch circuit layer 10, a backlight unit 20, a light shielding material 30, a second optical modulation layer 40, a first optical modulation layer 50, and a cover plate 60.

In the embodiment of FIG. 2, the touch circuit layer 10 has the touch sensing circuits, used for detecting the touch signals input by the user in the touch area 100. In one embodiment, the touch circuit layer 10 includes the electromagnetic induction circuits, but the present disclosure is not limited thereto.

In the embodiment of FIG. 2, the backlight unit 20 is disposed on the touch circuit layer 10 and including a backlight module to provide the necessary light for the touchpad 1. In one embodiment, the backlight module may be a side-entry backlight source, a direct-entry backlight source, or a combination thereof, but the present disclosure is not limited thereto.

In the embodiment of FIG. 2, the first optical modulation layer 50 is disposed between the cover plate 60 and the backlight unit 20, and disposed on the second optical modulation layer 40, and having a first reflectivity. The first optical modulation layer 50 is used for reducing the amount of light which passes through the touch area 100 and to shield the devices or the components disposed on the touch area 100. In one embodiment, the first optical modulation layer 50 can be implemented using printed semi-transparent ink or adhered semi-transparent film, but the present disclosure is not limited thereto.

In the embodiment of FIG. 2, the second optical modulation layer 40 is disposed between the touch circuit layer 10 and the first optical modulation layer 50, and having a second reflectivity and a first penetration rate, and is used for providing the electrical insulation protection. Additionally, the second optical modulation layer 40 covers the touch circuit layer 10 and is disposed within both the touch area 100 and the non-touch area 200. In one embodiment, the second optical modulation layer 40 is a semi-transparent or a transparent film. In one embodiment, the second optical modulation layer 40 can be made of polyester film, such as Mylar, but the present disclosure is not limited thereto. The second reflectivity of the second optical modulation layer 40 is the same as the first reflectivity of the first optical modulation layer 50. In one embodiment, the first reflectivity and the second reflectivity are between 5 and 10. Preferably, the first reflectivity and the second reflectivity can be 8, but the present disclosure is not limited thereto. In one embodiment, the first reflectivity of the first optical modulation layer 50 is the same as the first penetration rate of the second optical modulation layer 40. In one embodiment, an adhesive layer 90 is disposed between the first optical modulation layer 50 and the second optical modulation layer 40, and the first optical modulation layer 50 and the second optical modulation layer 40 are bonded to each other via the adhesive layer 90.

In the embodiment of FIG. 2, the light shielding material 30 is disposed on one side of the second optical modulation layer 40 facing the touch circuit layer 10 and defining a light penetration area. The area not covered by the light shielding material 30 is the light penetration area, wherein, in this embodiment, the light penetration area is the touch area 100. The light shielding material 30 is used for preventing the light from the backlight unit 20 from passing through the non-touch area 200 and for shielding the devices or the components disposed in the non-touch area 200. In one embodiment, the light shielding material 30 can be implemented using printed or coated black ink, but the present disclosure is not limited thereto.

In the embodiment of FIG. 2, the cover plate 60 is disposed on the first optical modulation layer 50, for protecting the internal components of the touchpad 1. Furthermore, the cover plate 60 is made of a material with high transmittance, such as glass or strengthened resin, but the present disclosure is not limited thereto.

In the embodiment shown of FIG. 2, because the second optical modulation layer 40 and the first optical modulation layer 50 have the same reflectivity or penetration rate, and the second optical modulation layer 40 and the first optical modulation layer 50 cover both the touch area 100 and the non-touch area 200 at the same time, the touch area 100 and the non-touch area 200 present the same color due to the same reflectivity via the second optical modulation layer 40 and the first optical modulation layer 50 when the backlight unit 20 is not emitting light, thereby enhancing the user's visual experience.

Figure 3:
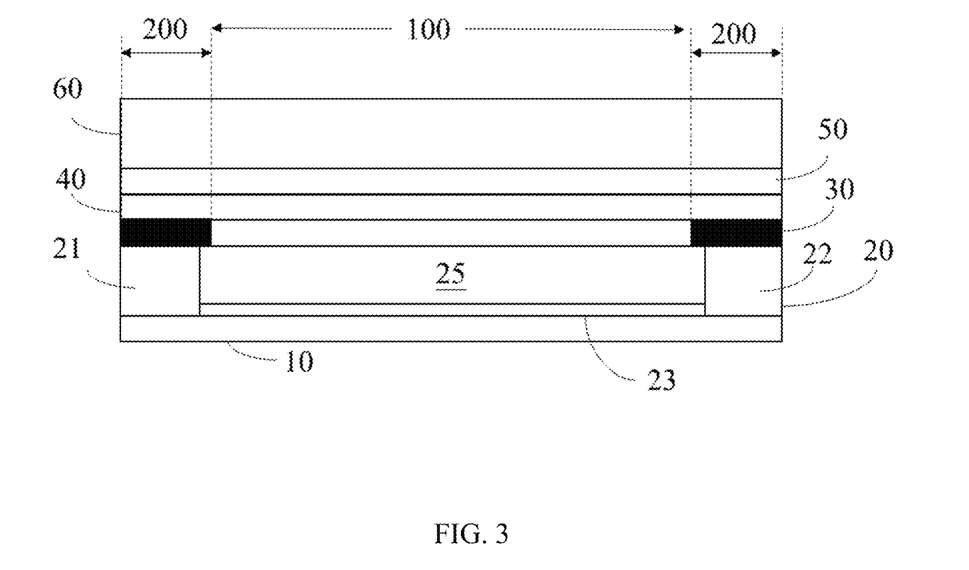
FIG. 3 illustrates another schematic drawing of the A-A' cross-section of the touchpad 1 of FIG. 1 of the second embodiment.

Please refer to FIG. 3, wherein FIG. 3 illustrates the schematic drawing of the A-A' cross-section of the touchpad 1 of FIG. 1 of the embodiment. In this embodiment, the backlight unit 20 furthermore includes a first light emitting unit 21, a second light emitting unit 22, a reflective layer 23 and a first light guiding film 25.

In the embodiment of FIG. 3, the first light emitting unit 21 is disposed on the touch circuit layer 10 and on one side of the first light guiding film 25, and is covered by the light shielding material 30, for facing the first light guiding film 25 to produce the light required for the touchpad 1. Specifically, the first light emitting unit 21 is covered by the light shielding material 30 along a direction perpendicular to the touch circuit layer 10.

In the embodiment of FIG. 3, the second light emitting unit 22 is disposed on the touch circuit layer 10 and on the other side of the first light guiding film 25, and disposed on the opposite side of the first light emitting unit 21, and is covered by the light shielding material 30, for facing the first light guiding film 25 to produce the light required for the touchpad 1. Specifically, the second light emitting unit 22 is covered by the light shielding material 30 along a direction perpendicular to the touch circuit layer 10.

In this embodiment, the first light emitting unit 21 and the second light emitting unit 22 are LED chips, but the present disclosure is not limited thereto.

In the embodiment of FIG. 3, the reflective layer 23 is disposed on the touch circuit layer 10, under the first light guiding film 25, and between the first light emitting unit 21 and the second light emitting unit 22. The reflective layer 23 is disposed correspondingly to the touch area 100 and is not covered by the light shielding material 30. The reflective layer 23 is used for reflecting the light emitted by the first light emitting unit 21 and the second light emitting unit 22, allowing the light to be emitted towards the cover plate 60. In one embodiment, the reflective layer 23 can be implemented using a metal coating, but the present disclosure is not limited thereto.

In the embodiment of FIG. 3, the first light guiding film 25 is disposed on the reflective layer 23, for guiding the light to go out along the direction towards the cover plate 60. In one embodiment, the first light guiding film 25 can be made of optical-grade polyester film (PET), polycarbonate (PC), or polypropylene (PP), but the present disclosure is not limited thereto.

Figure 4:
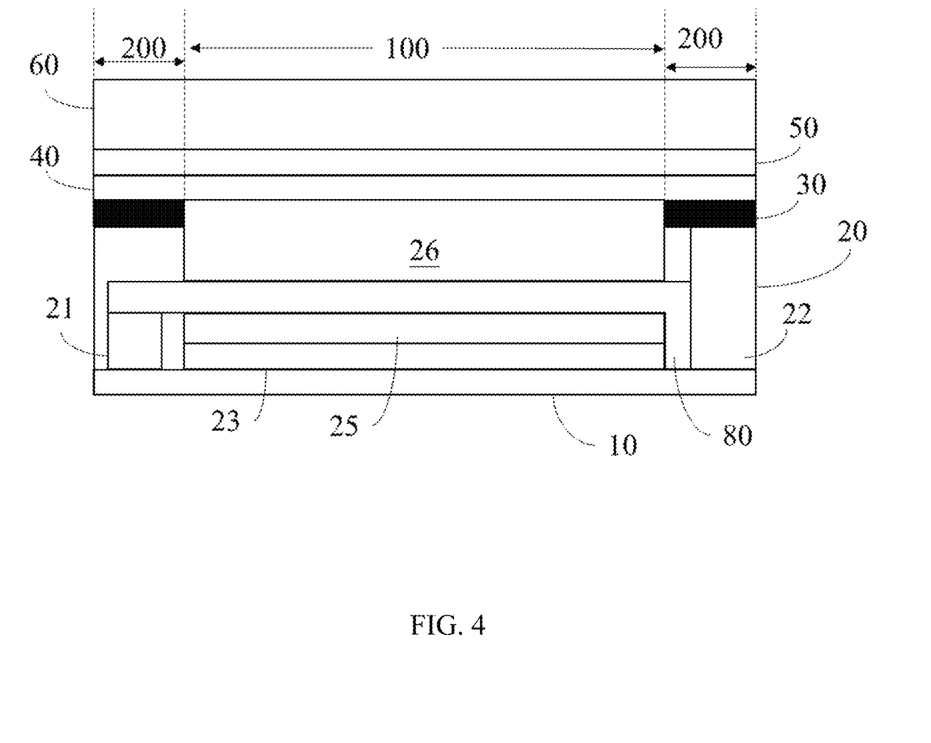
FIG. 4 illustrates yet another schematic drawing of the A-A' cross-section of the touchpad 1 of FIG. 1 of the third embodiment.

Please refer to FIG. 4, FIG. 4 illustrates the schematic drawing of the A-A' cross-section of the touchpad 1 of FIG. 1 of the embodiment. In the embodiment of FIG. 4, the backlight unit 20 includes a first light emitting unit 21, a second light emitting unit 22, a reflective layer 23, a first light guiding film 25, a second light guiding film 26, and a translucent insulation layer 80. The difference between the embodiment in FIG. 4 and the embodiment in FIG. 3 is that, the backlight unit 20 in the embodiment of FIG. 4 furthermore includes the second light guiding film 26 and the translucent insulation layer 80.

In the embodiment of FIG. 4, the translucent insulation layer 80 is disposed on the first light guiding film 25. Furthermore, the translucent insulation layer 80 covers the first light emitting unit 21 along a direction perpendicular to the touch circuit layer 10 and the translucent insulation layer 80 does not cover the second light emitting unit 22, and disposed between the second light emitting unit 22 and the first light guiding film 25.

Furthermore, the translucent insulation layer 80 has a first end and a second end, and the second end is perpendicular to the first end. The first end of the translucent insulation layer 80 is horizontally disposed on the first light guiding film 25, the second end of the translucent insulation layer 80 is connected to the first end and disposed between the first light guiding film 25 and the second light emitting unit 22, and extending towards the touch circuit layer 10. Therefore, the translucent insulation layer 80 has a bending part disposed between the first light guiding film 25 and the second light emitting unit 22. The translucent insulation layer 80 is shaped as L-shape.

In this embodiment, the translucent insulation layer 80 is used for reflecting the light emitted by the second light emitting unit 22, allowing the light to go out along a direction towards the cover plate 60.

In the embodiment of FIG. 4, the second light guiding film 26 is disposed on the translucent insulation layer 80 and under the second optical modulation layer 40, and is not covered by the light shielding material 30. The second light guiding film 26 is used for guiding the light emitted by the second light emitting unit 22 along the direction towards the cover plate 60. In one embodiment, the second light guiding film 26 can be made of optical-grade polyester film (PET), polycarbonate (PC), or polypropylene (PP), but the present disclosure is not limited to that design.

Figure 5:
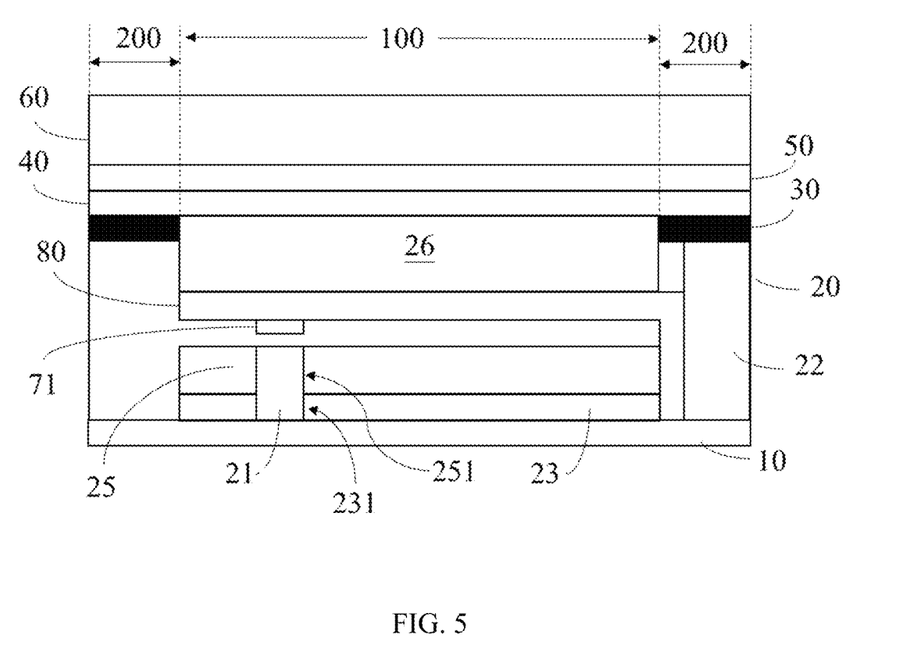
FIG. 5 illustrates another schematic drawing of the A-A' cross-section of the touchpad 1 of FIG. 1 of the fourth embodiment.

Please refer to FIG. 5, FIG. 5 illustrates a schematic drawing of the A-A' cross-section of the touchpad 1 of FIG. 1 of the embodiment. In the embodiment of FIG. 5, the backlight unit 20 includes the first light emitting unit 21, the second light emitting unit 22, the reflective layer 23, the first light guiding film 25, the second light guiding film 26, the translucent insulation layer 80, and the first reflective atomization unit 71. The difference between the embodiment in FIG. 5 and the embodiment in FIG. 4 is that, the backlight unit 20 in the embodiment of FIG. 5 furthermore includes the first reflective atomization unit 71.

In the embodiment of FIG. 5, the reflective layer 23 is disposed under the first light guiding film 25 and on the touch circuit layer 10, and the reflective layer 23 has a first hole 231.

In the embodiment of FIG. 5, the first light guiding film 25 is disposed on the touch circuit layer 10, and having a first through hole 251 corresponded to the reflective layer 23.

In the embodiment of FIG. 5, the first light emitting unit 21 is disposed on the touch circuit layer 10 and disposed within the first hole 231 of the reflective layer 23 and the first through hole 251 of the first light guiding film 25.

In the embodiment of FIG. 5, the first reflective atomization unit 71 is disposed at the first end of the translucent insulation layer 80 and facing one side of the reflective layer 23. Furthermore, the first reflective atomization unit 71 is corresponded to the first light emitting unit 21, and the first reflective atomization unit 71 covers the first light emitting unit 21. Therefore, in the embodiment of FIG. 5, the first light emitting unit 21 is covered by the first reflective atomization unit 71 along a direction perpendicular to the touch circuit layer 10, and is not covered by the light shielding material 30.

Figure 6:
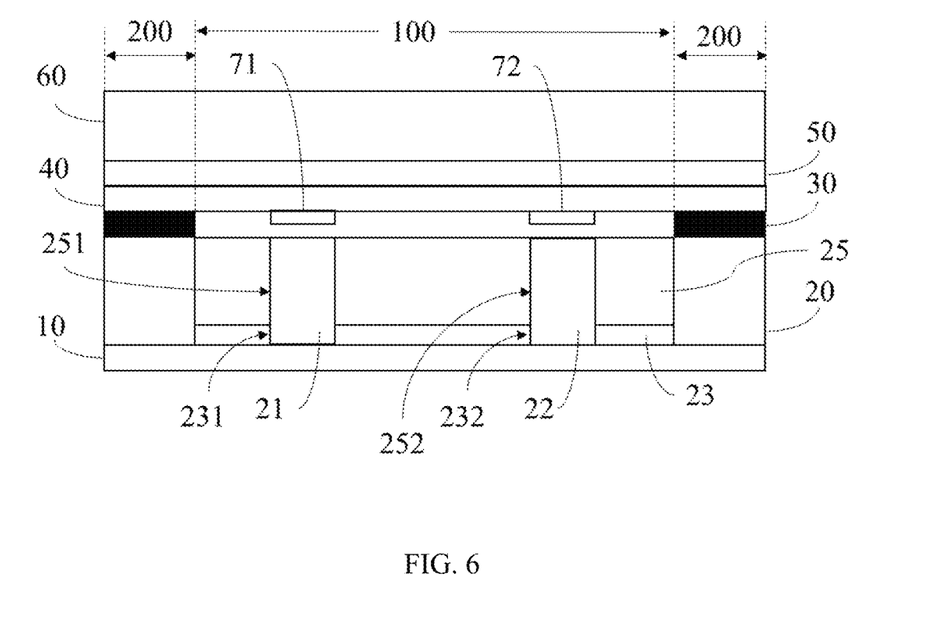
FIG. 6 illustrates another schematic drawing of the A-A' cross-section of the touchpad 1 of FIG. 1 of the fifth embodiment.

Please refer to FIG. 6, FIG. 6 illustrates a schematic drawing of the A-A' cross-section of the touchpad 1 of FIG. 1 of the embodiment. In the embodiment of FIG. 6, the backlight unit 20 includes the first light emitting unit 21, the second light emitting unit 22, the reflective layer 23, the first light guiding film 25, the first reflective atomization unit 71, and the second reflective atomization unit 72. The difference between the embodiment in FIG. 6 and the embodiment in FIG. 5 is that, the backlight unit 20 in the embodiment of FIG. 6 does not include the second light guiding film 26 and the translucent insulation layer 80, and backlight unit 20 in the embodiment of FIG. 6 includes the second reflective atomization unit 72.

In the embodiment of FIG. 6, the first light guiding film 25 is disposed on the touch circuit layer 10, and having a first through hole 251 and a second through hole 252.

In the embodiment of FIG. 6, the reflective layer 23 is disposed under the first light guiding film 25 and on the touch circuit layer 10, and the reflective layer 23 has a first hole 231 and a second hole 232.

In the embodiment of FIG. 6, the first light emitting unit 21 is disposed on the touch circuit layer 10 and is disposed within the first hole 231 of the reflective layer 23 and the first through hole 251 of the first light guiding film 25.

In the embodiment of FIG. 6, the second light emitting unit 22 is disposed on the touch circuit layer 10 and is disposed within the second hole 232 of the reflective layer 23 and the second through hole 252 of the first light guiding film 25.

In the embodiment of FIG. 6, the first reflective atomization unit 71 and the second reflective atomization unit 72 are disposed on one side of the second optical modulation layer 40 facing the reflective layer 23. Furthermore, the first reflective atomization unit 71 is corresponded to the first light emitting unit 21, and the first reflective atomization unit 71 covers the first light emitting unit 21. Furthermore, the second reflective atomization unit 72 is corresponded to the second light emitting unit 22, and the second reflective atomization unit 72 covers the second light emitting unit 22. Therefore, in the embodiment of FIG. 6, the first light emitting unit 21 is covered by the first reflective atomization unit 71 along a direction perpendicular to the touch circuit layer 10, and the second light emitting unit 22 is covered by the second reflective atomization unit 72 along the direction perpendicular to the touch circuit layer 10. The first light emitting unit 21 and the second light emitting unit 22 are not covered by the light shielding material 30.

Figure 7:
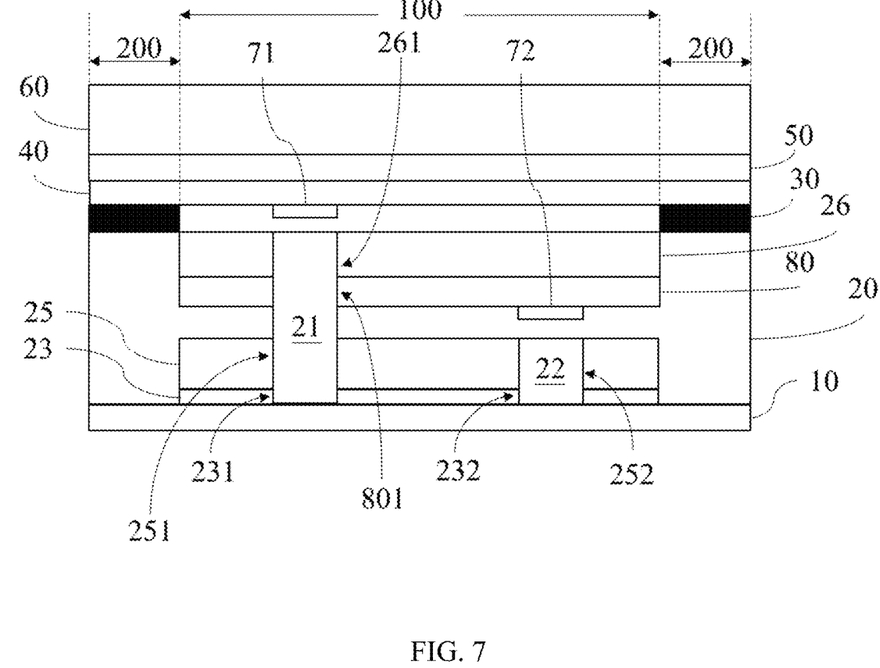
FIG. 7 illustrates another schematic drawing of the A-A' cross-section of the touchpad 1 of FIG. 1 of the sixth embodiment.

Please refer to FIG. 7, FIG. 7 illustrates a schematic drawing of the A-A' cross-section of the touchpad 1 of FIG. 1 of the embodiment. In the embodiment of FIG. 7, the backlight unit 20 includes the first light emitting unit 21, the second light emitting unit 22, the reflective layer 23, the first light guiding film 25, the second light guiding film 26, the first reflective atomization unit 71, the second reflective atomization unit 72, and the translucent insulation layer 80. The difference between the embodiment in FIG. 7 and the embodiment in FIG. 6 is that, the backlight unit 20 in the embodiment of FIG. 7 includes the second light guiding film 26 and the translucent insulation layer 80.

In the embodiment of FIG. 7, the first light guiding film 25 is disposed on the touch circuit layer 10, and having a first through hole 251 and a second through hole 252.

In the embodiment of FIG. 7, the reflective layer 23 is disposed under the first light guiding film 25 and on the touch circuit layer 10, and the reflective layer 23 has a first hole 231 and a second hole 232.

In the embodiment of FIG. 7, the translucent insulation layer 80 is disposed on the first light guiding film 25, and including a third hole 801.

In the embodiment of FIG. 7, the second light guiding film 26 is disposed on the translucent insulation layer 80, and having a second through hole 261.

In the embodiment of FIG. 7, the first light emitting unit 21 is disposed on the touch circuit layer 10, and is disposed within the first hole 231 of the reflective layer 23, the first through hole 251 of the first light guiding film 25, the third hole 801 of the translucent insulation layer 80, and the second through hole 261 of the second light guiding film 26.

In the embodiment of FIG. 7, the second light emitting unit 22 is disposed on the touch circuit layer 10 and is disposed within the second hole 232 of the reflective layer 23 and the second through hole 252 of the first light guiding film 25.

In the embodiment of FIG. 7, the first reflective atomization unit 71 is disposed on one side of the second optical modulation layer 40 facing the reflective layer 23. Furthermore, the first reflective atomization unit 71 is corresponded to the first light emitting unit 21, and the first reflective atomization unit 71 covers the first light emitting unit 21. Therefore, in the embodiment of FIG. 7, the first light emitting unit 21 is covered by the first reflective atomization unit 71 along a direction perpendicular to the touch circuit layer 10.

In the embodiment of FIG. 7, the second reflective atomization unit 72 is disposed on one side of the translucent insulation layer 80 facing the reflective layer 23. Furthermore, the second reflective atomization unit 72 is corresponded to the second light emitting unit 22, and the second reflective atomization unit 72 covers the second light emitting unit 22. Therefore, in the embodiment of FIG. 7, the second light emitting unit 22 is covered by the second reflective atomization unit 72 along a direction perpendicular to the touch circuit layer 10.

In the embodiment of FIG. 7, the first light emitting unit 21 and the second light emitting unit 22 are not covered by the light shielding material 30.

Figure 8:
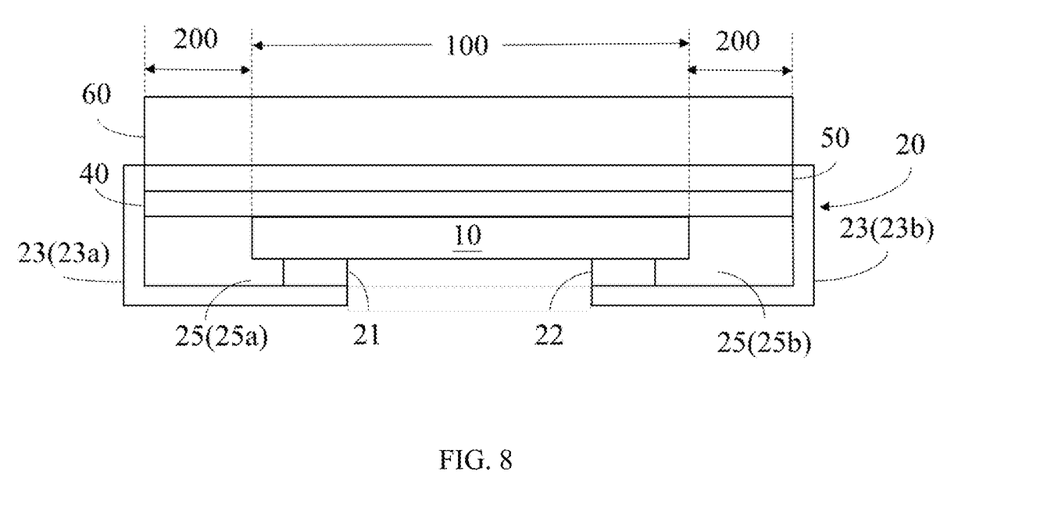
FIG. 8 illustrates another schematic drawing of the A-A' cross-section of the touchpad 1 of FIG. 1 of the seventh embodiment.

Please refer to FIG. 8, FIG. 8 illustrates another schematic drawing of the A-A' cross-section of the touchpad 1 of FIG. 1 of the embodiment. In the embodiment of FIG. 8, the backlight unit 20 includes the first light emitting unit 21, the second light emitting unit 22, the reflective layer 23 (23a, 23b) and the first light guiding film 25 (25a, 25b).

In the embodiment of FIG. 8, the touch circuit layer 10 is disposed between the cover plate 60 and the backlight unit 20, and is disposed on one side of the second optical modulation layer 40 facing the backlight unit 20.

In the embodiment of FIG. 8, the first light guiding film 25a is disposed on one side of the second optical modulation layer 40 facing the backlight unit 20, and is disposed on one side of the touch circuit layer 10. The first light guiding film 25a defines the light penetration area along a direction perpendicular to the touch circuit layer 10. In this embodiment, the light penetration area may be the non-touch area 200.

In the embodiment of FIG. 8, the first light guiding film 25b is disposed on one side of the second optical modulation layer 40 facing the backlight unit 20, and is disposed on the other side of the touch circuit layer 10. The first light guiding film 25b also defines the light penetration area along a direction perpendicular to the touch circuit layer 10.

In the embodiment of FIG. 8, the first light emitting unit 21 is disposed on one side of the touch circuit layer 10 away from the cover plate 60, and adjacent to the first light guiding film 25a. The second light emitting unit 22 is disposed on one side of the touch circuit layer 10 away from the cover plate 60, adjacent to the first light guiding film 25b, and disposed on the opposite side of the first light emitting unit 21.

In the embodiment of FIG. 8, the reflective layer 23a is disposed on one side of the touch circuit layer 10, and under the first light guiding film 25a, the reflective layer 23a covers the first light guiding film 25a and the first light emitting unit 21 in a direction perpendicular to the touch circuit layer 10, and the reflective layer 23a covers the first light guiding film 25a, the second optical modulation layer 40, and the first optical modulation layer 50 in a direction horizontal to the touch circuit layer 10. The reflective layer 23a is shaped as an L-shaped reflective layer.

In the embodiment of FIG. 8, the reflective layer 23b is disposed on one side of the touch circuit layer 10, and under the first light guiding film 25b, the reflective layer 23b covers the first light guiding film 25b and the first light emitting unit 22 in a direction perpendicular to the touch circuit layer 10, and the reflective layer 23b covers the first light guiding film 25b, the second optical modulation layer 40, and the first optical modulation layer 50 in a direction horizontal to the touch circuit layer 10. The reflective layer 23b is a mirror-image of the L-shaped reflective layer of reflective layer 23a.

In summary, the touchpad structure in the embodiment of the present disclosure places the second optical modulation layer between the light shielding material and the first optical modulation layer, and ensures that the touch area and non-touch area of the touchpad structure have the same reflectivity through the second optical modulation layer and the first optical modulation layer, such that the touch area and non-touch area of the touchpad structure present the same color when not emitting light, to achieve the purpose of improving user visual experience. Moreover, this touchpad structure in the embodiment of the present disclosure can be applied to the backlight module of different embodiments, to effectively enhance the convenience of touchpad structure design.

It is to be understood that the term "comprises", "comprising", or any other variants thereof, is intended to encompass a non-exclusive inclusion, such that a process, method, article, or device of a series of elements not only include those elements but also comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the invention. Accordingly, such modifications are considered within the scope of the invention as limited solely by the appended claims.

The invention claimed is:

1. A touchpad structure, comprising:
   a cover plate;
   a backlight unit;
   a touch circuit layer;
   a first optical modulation layer, disposed between the cover plate and the backlight unit, and comprising a first reflectivity; and
   a second optical modulation layer, disposed between the first optical modulation layer and the touch circuit layer, and one side of the second optical modulation layer facing the touch circuit layer comprising a light shielding material, and defining a light penetration area, the second optical modulation layer having a second reflectivity and a first penetration rate;
   wherein the second reflectivity is the same as the first reflectivity, or the first reflectivity is the same as the first penetration rate.

2. The touchpad structure as claimed in claim 1, wherein the backlight unit comprises:
   a first light guiding film;
   a first light emitting unit, disposed on the touch circuit layer and disposed on one side of the first light guiding film;
   a second light emitting unit, disposed on the touch circuit layer and disposed on another side of the first light guiding film; and
   a reflective layer, disposed under the first light guiding film.

3. The touchpad structure as claimed in claim 2, wherein the backlight unit furthermore comprises:
   a translucent insulation layer, disposed on the first light guiding film, and comprising a bending part; and
   a second light guiding film, disposed on the translucent insulation layer;
   wherein the bending part is disposed between the first light guiding film and the second light emitting unit, and the translucent insulation layer covers the first light emitting unit along a direction which is perpendicular to the touch circuit layer.

4. The touchpad structure as claimed in claim 2, wherein the first light emitting unit and the second light emitting unit are covered by the light shielding material along a direction which is perpendicular to the touch circuit layer.

5. The touchpad structure as claimed in claim 1, wherein the backlight unit comprises:
   a first light guiding film;
   a reflective layer, disposed under the first light guiding film, and comprising a first hole;
   a first light emitting unit, disposed on the touch circuit layer, and disposed in the first hole; and
   a second light emitting unit, disposed on the touch circuit layer.

6. The touchpad structure as claimed in claim 5, wherein the backlight unit furthermore comprises:
   a translucent insulation layer, disposed on the first light guiding film, and comprising a bending part;
   a second light guiding film, disposed on the translucent insulation layer; and
   a first reflective atomization unit, disposed on one side of the translucent insulation layer facing the reflective layer;
   wherein the bending part is disposed between the first light guiding film and the second light emitting unit, and the first reflective atomization unit is corresponded to the first light emitting unit.

7. The touchpad structure as claimed in claim 1, wherein the backlight unit comprises:
   a first light guiding film;
   a reflective layer, disposed under the first light guiding film, and comprising a first hole and a second hole;
   a first light emitting unit, disposed on the touch circuit layer, and disposed in the first hole; and
   a second light emitting unit, disposed on the touch circuit layer, and disposed in the second hole.

8. The touchpad structure as claimed in claim 7, wherein the backlight unit comprises:
   a first reflective atomization unit, disposed on one side of the second optical modulation layer facing the reflective layer, and the first reflective atomization unit is corresponded to the first light emitting unit; and
   a second reflective atomization unit, disposed on one side of the second optical modulation layer facing the reflective layer, and the second reflective atomization unit is corresponded to the second light emitting unit.

9. The touchpad structure as claimed in claim 7, wherein the backlight unit comprises:
   a translucent insulation layer, disposed on the first light guiding film, and comprising a third hole;
   a second light guiding film, disposed on the translucent insulation layer;
   a first reflective atomization unit, disposed on one side of the second optical modulation layer facing the reflective layer, and the first reflective atomization unit is corresponded to the first light emitting unit; and
   a second reflective atomization unit, disposed on one side of the translucent insulation layer facing the reflective layer, and the second reflective atomization unit is corresponded to the second light emitting unit.

10. The touchpad structure as claimed in claim 9, wherein the first light emitting unit is disposed in the third hole.

11. The touchpad structure as claimed in claim 1, wherein the touch circuit layer is disposed between the cover plate and the backlight unit.

12. The touchpad structure as claimed in claim 11, wherein the backlight unit comprises:
   a first light guiding film;
   a reflective layer, disposed under the first light guiding film;

a first light emitting unit, disposed on one side of the touch circuit layer away from the cover plate; and a second light emitting unit, disposed on one side of the touch circuit layer away from the cover plate, and disposed on an opposite side of the first light emitting unit.

13. The touchpad structure as claimed in claim 1, further comprising an adhesive layer disposed between the first optical modulation layer and the second optical modulation layer.

* * * * *